(12) United States Patent
Koesters (10) Patent No.: US 7,832,101 B2
(45) Date of Patent: Nov. 16, 2010

(54) METHOD AND ASSEMBLY FOR MOUNTING ROTOR BLADE BEARINGS OF A WIND TURBINE

(75) Inventor: Achim Koesters, Neuenkirchen (DE)

(73) Assignee: General Electric Company, Schenectady, NY (US)

(*) Notice: Subject to any disclaimer, the term of this patent is extended or adjusted under 35 U.S.C. 154(b) by 175 days.

(21) Appl. No.: 12/338,251

(22) Filed: Dec. 18, 2008

(65) Prior Publication Data

US 2010/0139093 A1    Jun. 10, 2010

(51) Int. Cl.
  *B21K 25/00* (2006.01)
  *B23P 19/04* (2006.01)
  *B63H 1/06* (2006.01)
(52) U.S. Cl. ............... 29/889.21; 416/131; 416/132 B; 416/147; 29/256; 29/258; 29/259
(58) Field of Classification Search ............ 29/889.21, 29/256, 258, 259; 81/57.14, 124.2, 124.5; 356/614; 416/147, 131, 132 B
See application file for complete search history.

(56) References Cited

U.S. PATENT DOCUMENTS 2,372,416 A * 3/1945 Fairhurst .................. 416/162

* cited by examiner

*Primary Examiner*—David P Bryant
*Assistant Examiner*—Alexander P Taousakis
(74) *Attorney, Agent, or Firm*—Global Patent Operation; Douglas D. Zhang (57) ABSTRACT

A method and an assembly for fastening at least one screw nut to be tightened of a rotor blade bearing of a wind turbine are provided. A screw nut driver assembly is provided at a rotatable portion of the rotor blade bearing, the screw nut driver assembly being adapted to automatically tighten the at least one screw nut. The screw nut driver assembly is aligned with the screw nut to be tightened by rotating the rotatable portion with a pitch drive of the wind turbine. Then the screw nut is tightened using the screw nut driver assembly.

5 Claims, 7 Drawing Sheets

METHOD AND ASSEMBLY FOR MOUNTING ROTOR BLADE BEARINGS OF A WIND TURBINE

BACKGROUND

The present invention generally relates to wind turbines having a machine nacelle and a rotor including at least one rotor blade and a hub. The present invention specifically relates to rotor blade bearings which are provided for rotating the at least one rotor blade about its longitudinal axis such that a pitch angle of the respective rotor blade may be adjusted.

Wind turbines are used as an efficient conversion means to convert environmental energy into electrical energy. The rotor of a wind turbine has a main shaft and drives an electrical generator which converts the mechanical rotational energy into electrical energy. The conversion of environmental energy in the form of wind energy into mechanical rotational energy is provided by means of the at least one rotor blade which typically is shaped as an airfoil.

The pitch angle of the rotor blade may be adjusted in order to cope with varying wind velocities such that a driving moment applied at a main shaft of the wind turbine may be adapted to changing environmental conditions of the wind turbine.

The pitch angle of an individual airfoil (rotor blade) may be adjusted, i.e. a rotational position of the individual rotor blade with respect to its longitudinal axis may be adjusted. Typically, each rotor blade of a wind turbine is connected to the hub of the wind turbine via a rotor blade bearing.

As rotor blades are large and heavy components mounting of an individual rotor blade at the hub of a wind turbine is a major issue. The rotor blade bearing is connected to the hub of the wind turbine by means of a plurality of bolt-screw nut pairs which are typically fastened and tightened in a predetermined order.

A large number of bolt-screw nut pairs provides a secure connection of the individual rotor blade bearing to the hub. On the other hand, fastening and tightening of a large number of screw nuts onto bolts is a time-consuming and costly measure.

SUMMARY

In view of the above a method for fastening at least one screw nut to be tightened of a rotor blade bearing of a wind turbine is provided, the method including the steps of providing a screw nut driver assembly at a rotatable portion of the rotor blade bearing, the screw nut driver assembly being adapted to automatically tighten the at least one screw nut, of aligning the screw nut driver assembly with the screw nut to be tightened by rotating the rotatable portion with a pitch drive of the wind turbine, and of tightening the screw nut with the screw nut driver assembly.

According to another aspect a screw nut driver assembly adapted for automatically fastening at least one screw nut of a rotor blade bearing of a wind turbine is provided, the screw nut driver assembly being further adapted to be mounted at a rotatable portion of the rotor blade bearing and to be aligned with a screw nut to be tightened by rotating the rotatable portion with a pitch drive of the wind turbine.

According to yet another aspect a position detector adapted for detecting a position of a screw nut driver with respect to a screw nut of a rotor blade bearing of a wind turbine is provided, the position detector including a proximity sensor adapted for sensing a screw nut to be tightened, and a control and position logic adapted for providing a control signal for the screw nut driver.

Further exemplary embodiments are according to the dependent claims, the description and the accompanying drawings.

DRAWINGS

A full and enabling disclosure of the present invention, including the best mode thereof, to one of ordinary skill in the art is set forth more particularly in the remainder of the specification including reference to the accompanying drawings wherein.

DETAILED DESCRIPTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

Figure 1:
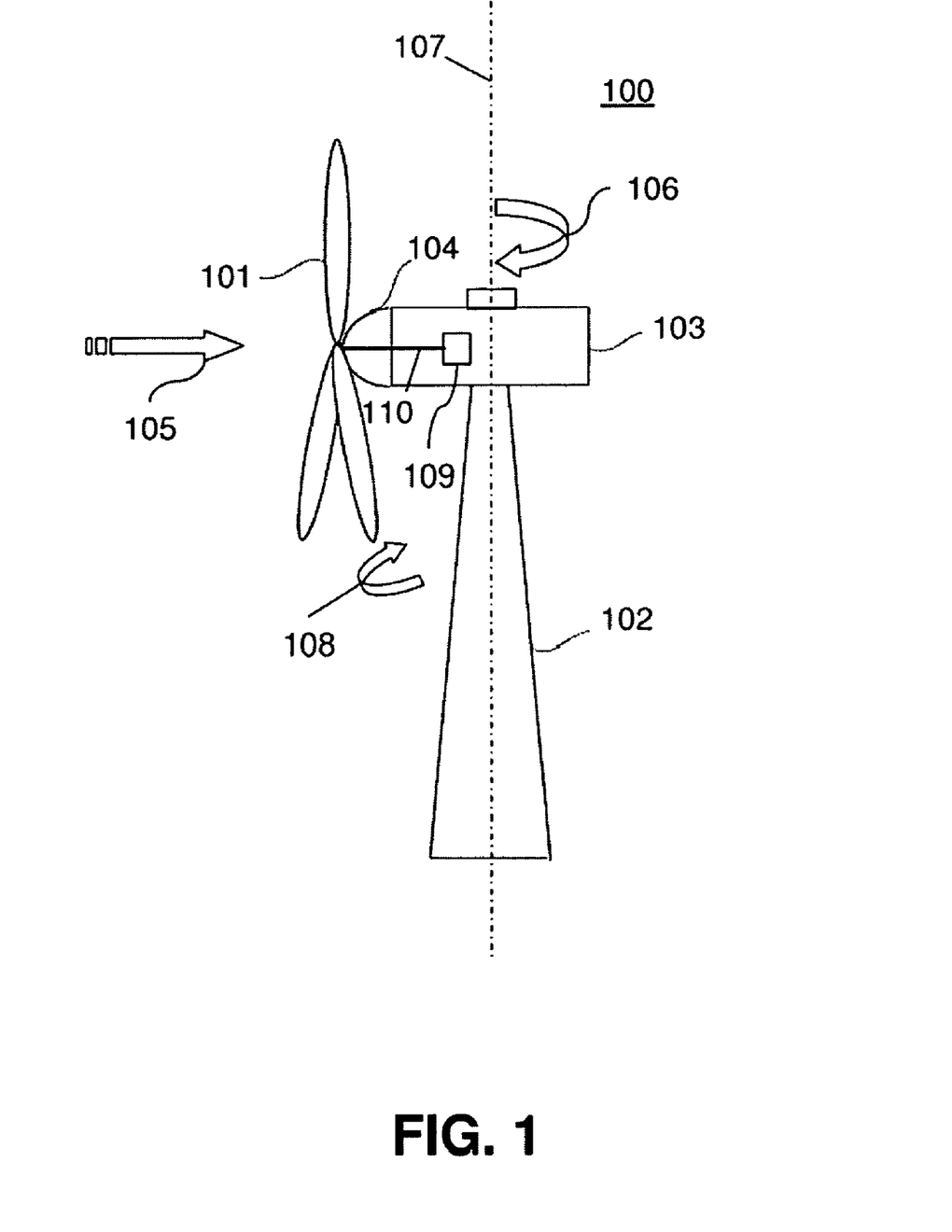
FIG. 1 shows a side view of a wind turbine having a tower and a rotatable machine nacelle atop the tower, wherein the machine nacelle includes a rotor having at least one rotor blade.

FIG. 1 shows a side view of a wind turbine 100 including a tower 102 and a machine nacelle 103 arranged rotatably atop the tower 102.

The tower 102 may be a tubular tower as the one shown in FIG. 1. The tower typically has a tower axis 107 which may be arranged in a vertical direction. The machine nacelle 103 may be rotated about the tower axis 107 with respect to a yaw angle 106.

The yaw angle 106 is adjusted such that an incident wind direction 105 typically coincides with the axis of a main shaft 110 of a rotor of the wind turbine 100. The rotor of the wind turbine furthermore includes a hub 104 and at least one rotor blade 101 which is attached to the hub 104.

A mechanical connection between the at least one rotor blade 101 and the hub 104 of the wind turbine is typically provided by means of a respective rotor blade bearing. The rotor blade bearing is designed such that the individual rotor blade 101 is connected to the hub 104 such that the rotor blade 101 is rotatable about its longitudinal axis such that a pitch angle 108 of the rotor blade may be adjusted.

An adjustment of the pitch angle 108 typically is performed in order to adapt a mechanical torque transferred to the main axis 110 of the wind turbine to a strength of the incoming wind 105. As a mechanical torque applied at the main axis 110 of the wind turbine 100 is converted into an electrical energy by means of an electrical generator 109, an input rotational frequency of the main shaft 110 typically is within predetermined limits.

Thus, the rotor blade is adjusted with respect to its pitch angle 108 such that the incoming wind strength 105 results in a specific predetermined rotation frequency of the main shaft 110. A rotor blade bearing (not shown in FIG. 1) may be a complex system providing a support for an individual rotor blade 101 and is described in more detail with respect to FIGS. 2, 3 and 4 herein below.

Figure 2:
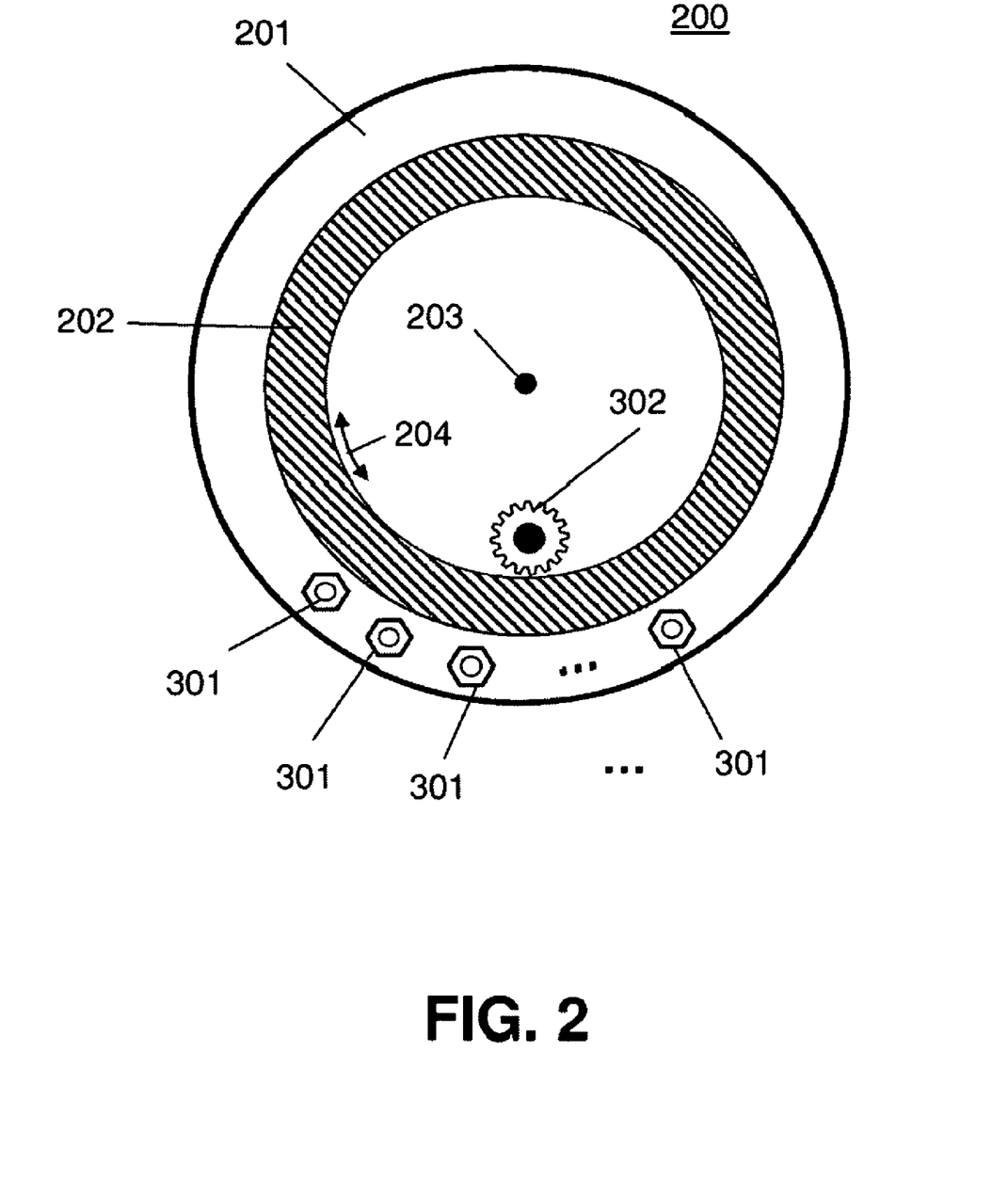
FIG. 2 is a schematic view of a rotor blade bearing having a first ring-shaped mounting unit and a second ring-shaped mounting unit which is rotatable within the first ring-shaped mounting unit.

FIG. 2 illustrates a rotor blade bearing 200 including a first ring-shaped mounting unit 201 and a second ring-shaped mounting unit 202 which is arranged coaxially to the first ring-shaped mounting unit 201 about a central bearing axis 203. The inner (second) ring-shaped mounting unit 202 which is a rotatable portion of the rotor blade bearing, is rotatable in a direction 204 within the (fixed) outer (first) ring-shaped mounting unit 201.

An individual rotor blade (not shown in FIG. 2) is supported by the second ring-shaped mounting unit 202 such that a change of the rotational position 204 of the second ring shaped mounting unit with respect to the first ring shaped mounting unit results in an adjustment of the pitch angle 106 (shown in FIG. 1) with respect to a longitudinal axis of the rotor blade 101. The first ring-shaped mounting unit 201 is fixed to the hub 104 (not shown in FIG. 2) of the wind turbine 100 using bolt-nut pairs 301.

The nuts are arranged circumferentially along the first ring-shaped mounting unit 201 and provide a secure connection of the rotor blade bearing 200 to the hub 104 of the wind turbine 100. In FIG. 2, only some of the bolt-nut pairs 301 are shown for illustrative purposes. In the hub, a rotor blade drive (not shown) is provided. The rotor blade drive drives a pitch drive gear 302 which in turn may rotate the second ring-shaped mounting unit 202 in the direction 204, e.g. back and forth in order to adjust the pitch angle 108 (FIG. 1). To this end, the second mounting unit 202 is provided with a tooth rack 303 which meshes with the pitch drive gear 302.

Figure 3:
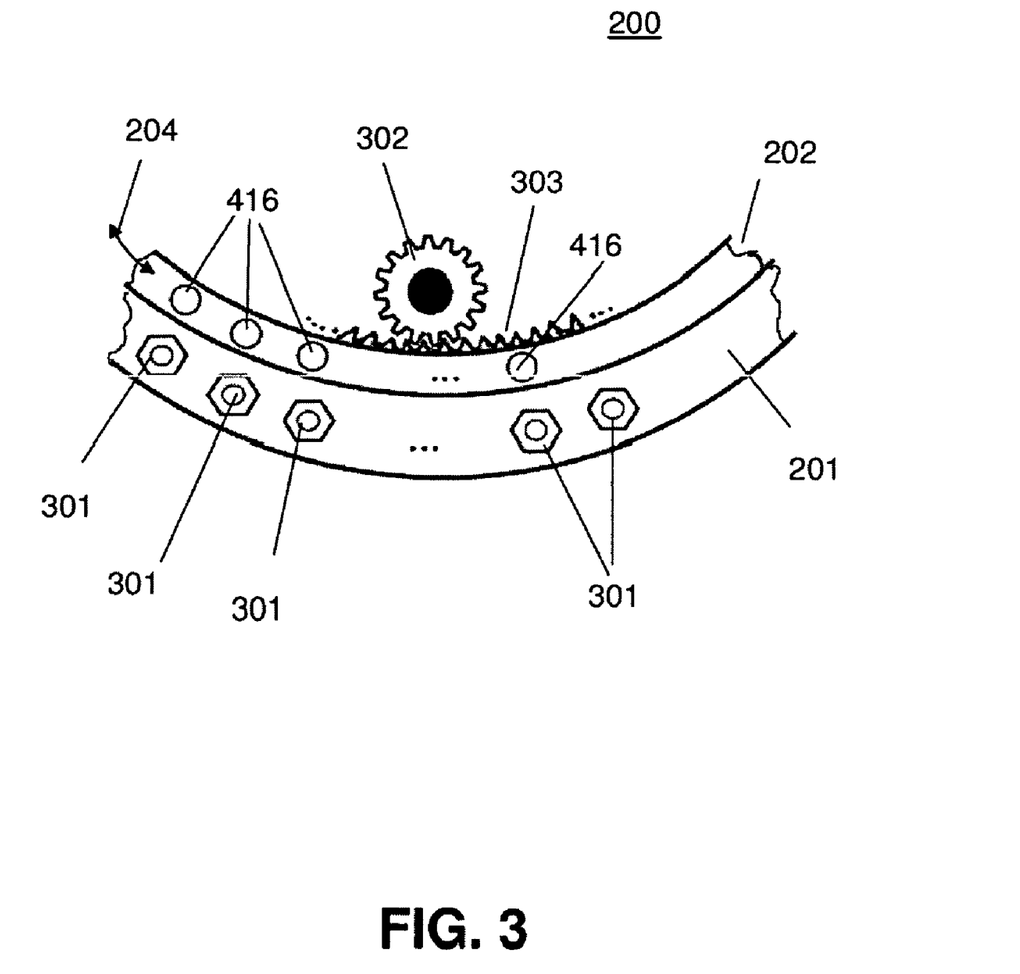
FIG. 3 is a partial view of the rotor blade bearing shown in FIG. 2, wherein a drive system for adjusting the pitch angle of the rotor blade is illustrated.

FIG. 3 is a partial view of the rotor blade bearing 200 shown in FIG. 2. FIG. 3 depicts respective parts of the first ring-shaped mounting units 201 and the second ring-shaped mounting unit 202 arranged within the first ring-shaped mounting unit 201 and being rotatable with respect to a direction 204. FIG. 3 details the pitch drive system which typically consists of a pitch drive gear 302 which is rotatable and which is driven by a pitch drive unit (not shown).

The second ring shaped mounting unit 202 is provided with rotor blade mounting holes 416. These holes are designed for bolts which will fix the respective rotor blade at the second ring shaped mounting unit 202 of the rotor blade bearing 200.

The pitch drive gear 302 engages with a toothed rack 303 which is attached circumferentially at the inner (second) ring-shaped mounting unit 202 in order to change the pitch angle 108 of an individual rotor blade 101 (FIG. 1).

Figure 4:
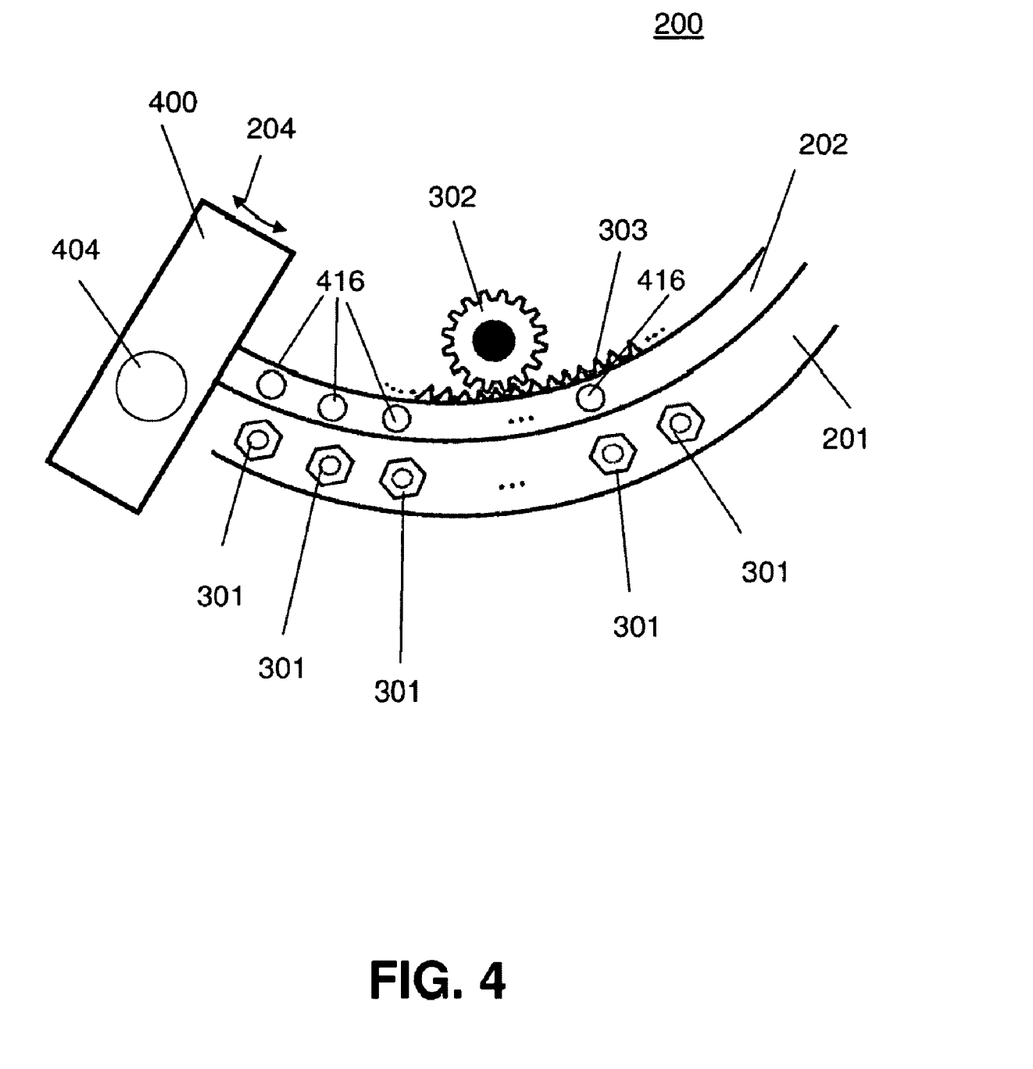
FIG. 4 is a partial view of the rotor blade bearing shown in FIG. 2, wherein the partial view of FIG. 4 is similar to the partial view shown in FIG. 3 except that a support plate supporting a screw nut driver is attached at the rotatable second ring-shaped mounting unit, according to a typical embodiment.

It is noted here that, in order to avoid a redundant description, components which have been described with respect to previous figures, are not repeatedly detailed in FIG. 4 and the following drawings.

FIG. 4 is another partial view of a rotor blade bearing 200 having a first ring-shaped mounting unit 201 and a second ring-shaped mounting unit 202 arranged rotatably within the first ring-shaped mounting unit 201. The second ring-shaped mounting unit 202 includes the toothed rack 303 which engages with the pitch drive gear 302 described herein above with respect to FIGS. 2 and 3.

The pitch drive gear 302—toothed rack 303 combination drives the second ring-shaped mounting unit 202 in directions indicated by an arrow 204. It is noted here that the rotor blade bearing 200 shown in FIGS. 2, 3 and 4 may include bearing components which provide a smooth movement of the second ring-shaped mounting unit 202 with respect to the first ring-shaped mounting unit 201, e.g. roller bearings and/or journal bearings. As this is well-known to the skilled practitioner, it is not detailed in the figures and in the description.

As shown in FIG. 4, a screw nut driver assembly 400 is attached to the rotatable second ring-shaped mounting unit 202. The screw nut driver assembly 400 is described in detail with respect to FIG. 5 herein below. The screw nut driver assembly 400 includes a screw nut driver 404 which is adapted for tightening at least one screw nut 301 used for mounting the first ring-shaped mounting unit 201 to the hub 104 (not shown) of the wind turbine 100.

According to a typical embodiment, the screw nut driver assembly 400 is arranged such that the screw nut driver 404 may be positioned in alignment with respect to at least one screw nut 301 to be tightened. After having tightened a screw nut 301, the screw nut driver assembly 400 is moved to the position of an adjacent or another screw nut 301 to be tightened.

The screw nut driver 404 may be provided as a screw nut driver adapted for tightening the screw nuts with a predetermined torque. In order to position the screw nut driver assembly 400 together with his screw nut driver 404 above and/or in alignment with a screw nut 301 to be tightened, according to a typical embodiment the pitch drive system is operated such that the pitch drive gear 302 is driven by the pitch drive system (not shown in FIG. 4). As the pitch drive gear 302 engages with the toothed rack 303 of the second ring-shaped mounting unit 202, the screw nut driver assembly 400 is moved in a circle about the central bearing axis 203 (see FIG. 2).

A specific advantage of this kind of arrangement of the screw nut driver assembly 400 at the second ring-shaped mounting unit 202 of the rotor blade bearing 200 is that the pitch drive system of the wind turbine is used to positioning this screw nut driver assembly 400 above a screw nut 301 to be tightened. Thus, no additional positioning system for positioning the screw nut driver assembly 400 above a screw nut 301 is required. In other words, the method as described herein provides an automatic screw nut driver assembly which cooperates with the pitch drive system of the wind turbine. Once the screw nut driver 404 is positioned together with the screw nut driver assembly 400 above a screw nut 301 to be tightened, this screw nut driver may engage with the screw nut to be tightened and may tighten the screw nut to be tightened.

The steps of operating the pitch drive system such that the screw nut driver is positioned in alignment with the screw nut 301 to be tightened, of engaging the screw nut driver 404 with the screw nut 301 to be tightened and of tightening this screw nut 301 are repeated until all screw nuts 301 of the first ring-shaped mounting unit 201 of the rotor blade bearing 200 are tightened.

Furthermore, it is possible to measure a torque during tightening the screw nut 301. The torque measurement provides a secure fastening of the first ring shaped mounting unit 201 to the hub 104, because eventually jammed bolts, nuts or bolt-nut pairs are automatically detected. Thus a torque may be measured at the location of the bearing and a comparison of measured torque before/after tightening of a screw nut is detectable. If surfaces of the hub and the bearing which are contacting each other and which have low tolerances, are not even within predetermined limits, then this kind of unevenness may be detected immediately after tightening a number of or all bolts. Thus the advantage is provided that any unevenness may be determined at an early stage and that respective components may possibly be exchanged prior to mounting of an entire rotor blade bearing.

According to another typical embodiment, the first ring-shaped mounting unit 201 of the rotor blade bearing 200 is fixed to the hub 104 (see FIG. 1) of the wind turbine 100 by means of bolts which are arranged circumferentially symmetrical along the first ring-shaped mounting unit 201. Thus, the screw nut driver assembly 400 is positioned at a rotation angle of a respective offset from a previous position where a screw 301 to be tightened is located.

In accordance with yet another typical embodiment, more than one screw nut driver assembly 400 may be arranged at the second ring-shaped mounting unit 202 such that the mounting time may be reduced. For example, two screw nut driver assemblies 400 may be arranged at the second ring-shaped mounting unit 202 diametrically opposite to each other. An advantage of that kind of arrangement is that a mounting time for mounting the first ring shaped mounting unit at the hub 104 is reduced by typically a factor of 2. Another advantage of providing more than one screw nut driver assembly 400 is that bolts located diametrically opposite to each other may be tightened simultaneously such that any tilting or misalignment is avoided.

Furthermore, a control and position unit may be provided for positioning the screw nut driver assembly in an alignment with a screw nut 301 to be tightened.

A position detector 403 which is described herein below with respect to FIG. 6, may be provided in order to facilitate a positioning of the screw nut driver assembly 400. The position detector 403 may be provided as a proximity sensor such as an inductive sensor and/or an optical sensor. Furthermore, it is possible to measure a torque when the pitch drive system is operated. A current drain from the pitch drive system is measured. Furthermore, it is possible to measure a direct torque from the pitch drive system. The torque measurement provides a secure and even fastening of the first ring shaped mounting unit 201 to the hub 104. If a screw nut and/or a bolt should block during fastening, such kind of blocking could be detected by means of the torque measurement.

Figure 5:
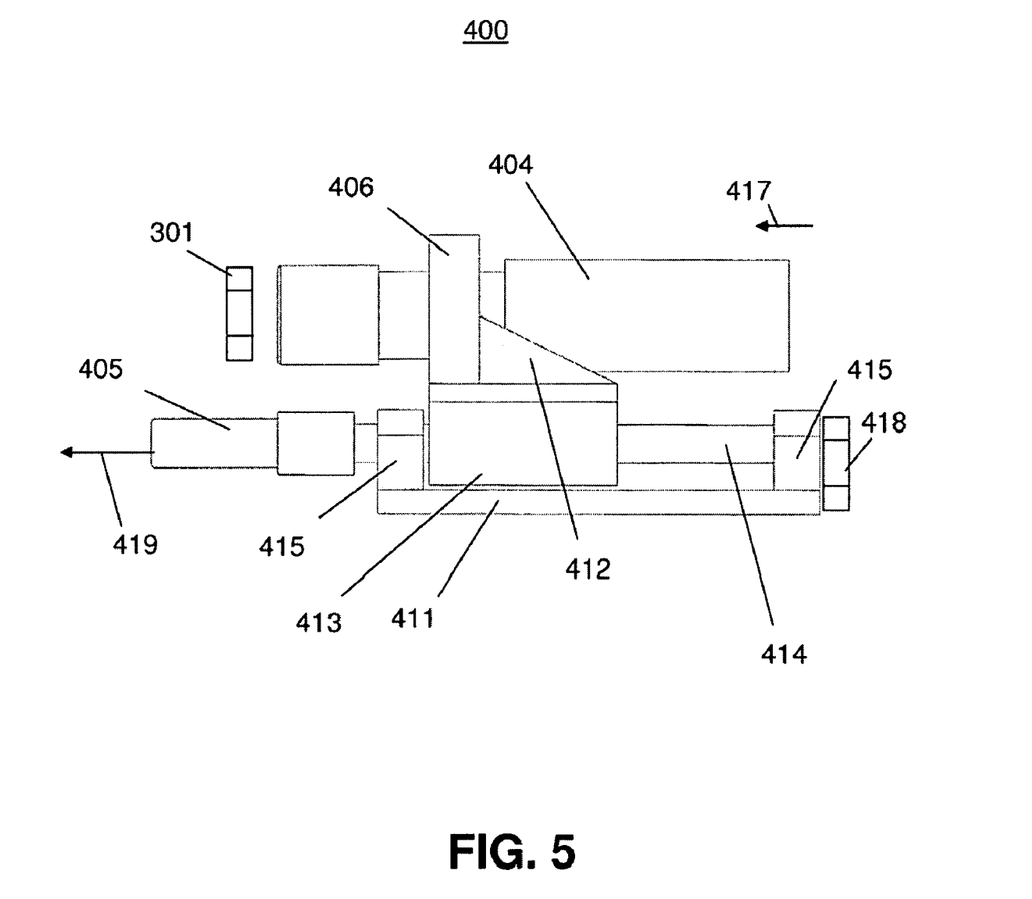
FIG. 5 is a side view of a screw nut driver assembly used for fastening and tightening screw nuts of the first ring-shaped mounting unit shown in FIGS. 2, 3 and 4, according to a typical embodiment.

FIG. 5 is a schematic side view of a screw nut driver assembly 400 according to a typical embodiment. The screw nut driver assembly 400 includes a support plate 411 which is adapted to be mounted at the second ring-shaped mounting unit 202 of the rotor blade bearing 200, as shown in FIG. 4.

At the support plate 410, two fixing blocks 415 are mounted which are used for holding a guiding shaft 414 on which a linear guiding unit 413 may be moved in the longitudinal direction of the guiding shaft 414. A workpiece mounting unit 405 is provided in order to fix the screw nut driver assembly 400 at the second ring-shaped mounting unit 202 of the rotor blade bearing 200. The workpiece mounting unit 405 may have a conical shape such that it may be clamped at the second ring-shaped mounting unit 202 of the rotor blade bearing 200. A clamping direction is indicted by an arrow 419 in FIG. 5. Furthermore a fixing nut 418 may be used to fix the workpiece mounting unit 405 at the second ring-shaped mounting unit 202.

A position of the linear guiding unit 413 along the guiding shaft 414 is provided on the basis of a feed motion signal 410 indicated in FIG. 6 herein below. The feed motion signal 410 is provided for the workpiece mounting unit 405 such that the screw nut driver 404 may be positioned such that it engages with a screw nut 301 to be tightened. To achieve this kind of engagement, the screw nut driver is moved in a direction of an arrow indicated by a reference numeral 417, i.e. in a feeding direction towards the screw nut 301 to be tightened.

The screw nut driver 404 is attached at the moveable linear guiding unit 413 by means of a workpiece mounting connection 406. The screw nut driver 404 may be designed as a screw nut driver including a power motor which can apply a torque which is typical for tightening the screw nuts 301 to be tightened (see FIGS. 2, 3 and 4). A bracket 412 is provided in order to fix the workpiece mounting connection 406 at the linear guiding unit 413. The screw nut driver assembly 400 is adapted for fastening the at least one rotor blade bearing 200 at the hub 104 of the wind turbine 100.

A pitch drive system of the wind turbine 100 which is provided for adjusting a pitch angle 108 of the wind turbine 100 is used for positioning the screw nut driver assembly 400 together with the screw nut driver 404 in an alignment with a screw nut 301 to be tightened.

Figure 6:
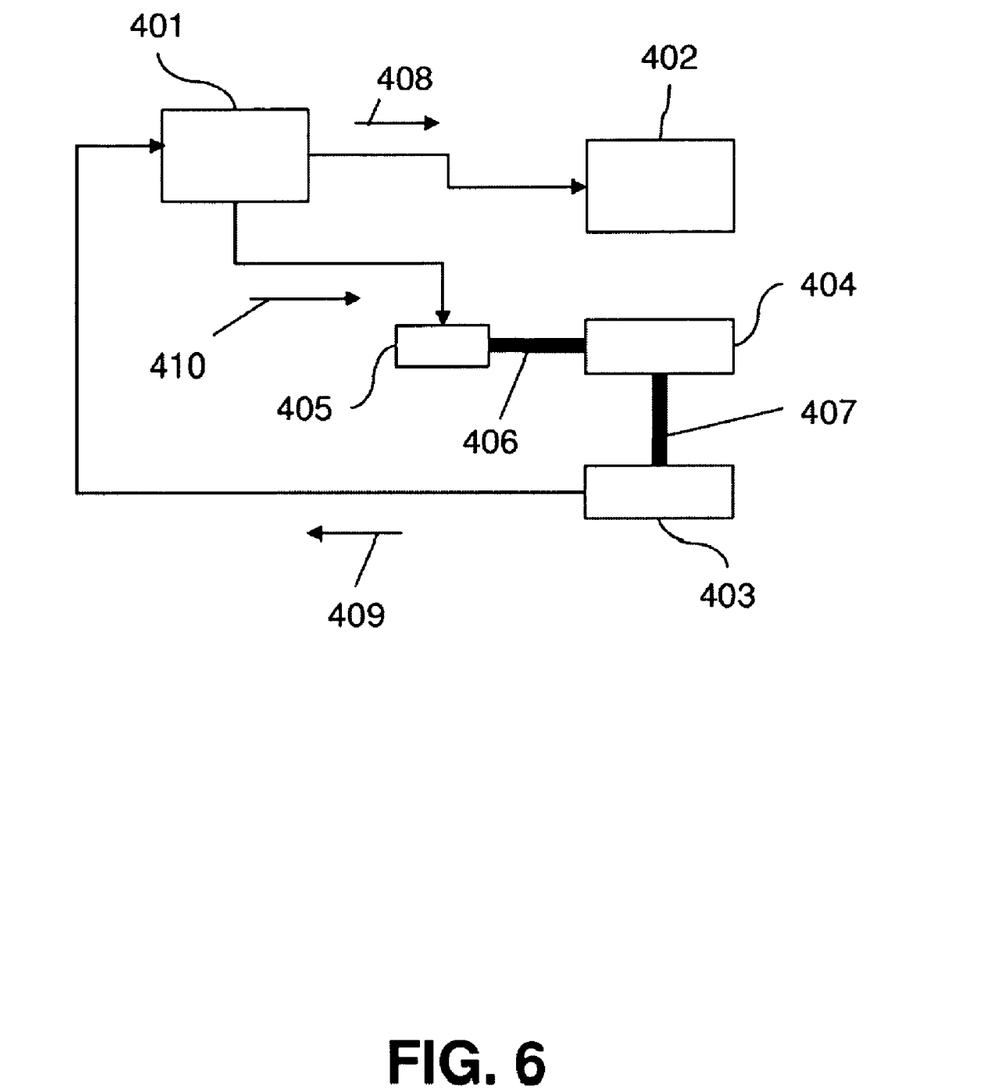
FIG. 6 is a block diagram of a control system for the screw nut driver assembly shown in FIG. 5, according to a typical embodiment.

FIG. 6 is a schematic block diagram of a control system provided for controlling a fastening of at least one rotor blade bearing at a hub of a wind turbine 100. The control system typically includes a controller unit 401 which provides a pitch driver signal 408 for a pitch drive system 402 and a feed motion signal 410 for the workpiece mounting unit 405, which has been described with respect to FIG. 5 herein above.

The controller unit 401 may receive a position signal 409 indicating a position of the screw nut driver assembly with respect to a screw nut 301 to be tightened. The position signal 409 is provided by a position detector 403 which may be an inductive detector and/or an optical detector. The position detector 403 is attached at the screw nut driver 404 and the screw nut driver assembly 400, respectively, by means of a position detector support 407.

If the position signal 409 indicates that the screw nut driver 404 is positioned in an alignment with a screw nut 301 to be tightened, the controller unit 401 emits the feed motion signal 410 to the workpiece mounting unit 405 which is connected to the screw nut driver 404 by means of the workpiece mounting connection 406. Thus, the workpiece mounting unit 405 provides an engagement of the screw nut driver 404 with the screw nut 301 be tightened (not shown in FIG. 6).

After tightening, the screw nut 301 to be tightened, the screw nut driver 404 is released from the screw nut 301 which has been tightened, and the controller unit 401 provides a pitch drive signal 408 for the pitch drive system 402 such that the screw nut driver assembly 400 together with the screw nut driver 404 may be positioned in an alignment with another screw nut 301 to be tightened. This procedure may be repeated until all screw nuts to be tightened are tightened.

Figure 7:
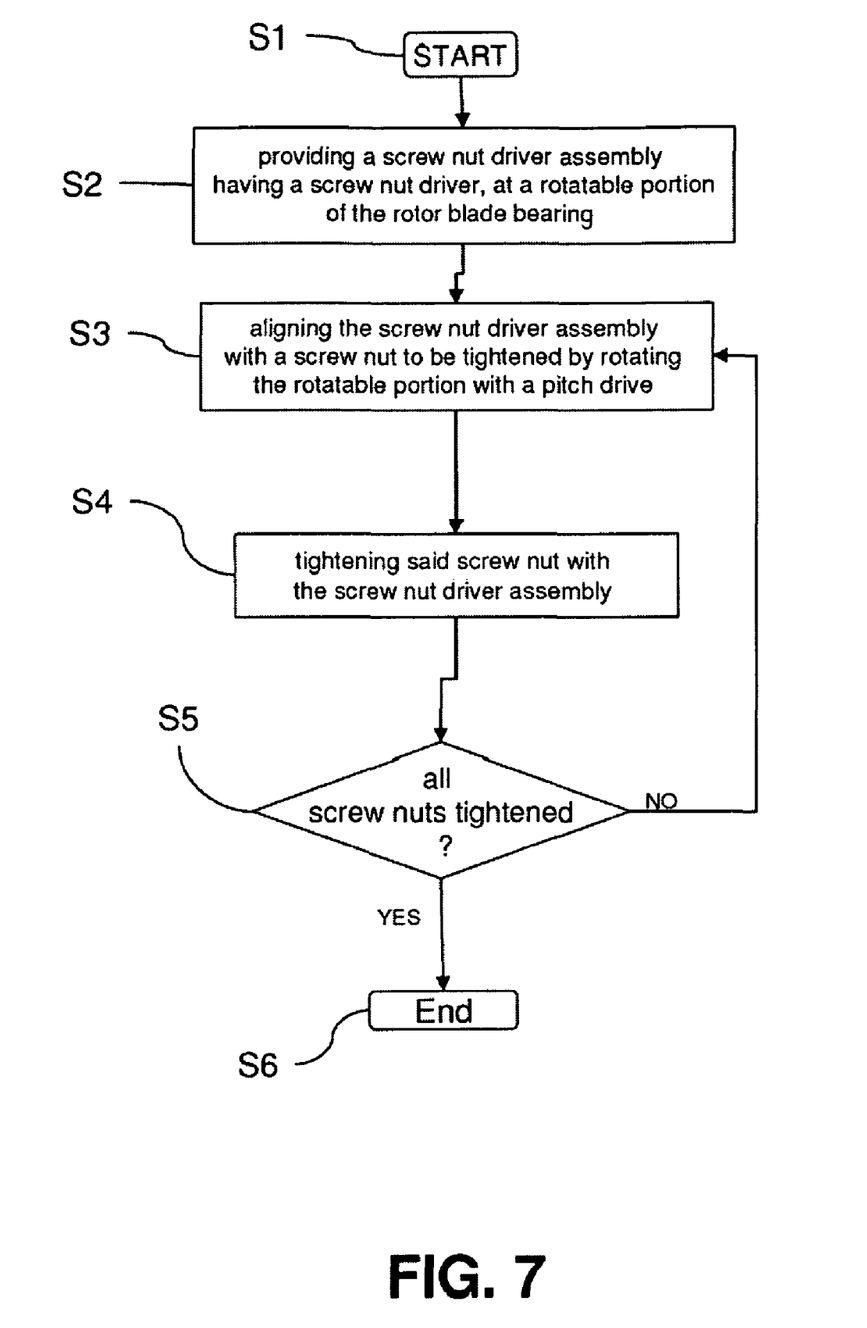
FIG. 7 is a flowchart of a method for fastening at least one rotor blade bearing at a hub of a wind turbine, according to a typical embodiment.

FIG. 7 is a flowchart of a method for fastening at least one rotor blade bearing 200 at the hub 104 of a wind turbine 100, wherein the wind turbine has a pitch drive system adapted for adjusting a pitch angle of at least one rotor blade 101.

The procedure starts at a step S1 and proceeds to a step S2 where a screw nut driver assembly 400 is provided at a rotatable portion of the rotor blade bearing. The screw nut driver assembly is adapted to automatically tighten a screw nut 301 to be tightened. The screw nut driver assembly has a screw nut driver.

At a step S3, the screw nut driver assembly is aligned with a screw nut to be tightened by rotating the rotatable portion with a pitch drive of the wind turbine. The positioning of the screw nut driver assembly may be assisted by means of a position detector 403 (see FIG. 6) which allows an exact positioning with respect to a direction 204 (FIG. 2) of the entire screw nut driver assembly 400.

The procedure advances to a step S4 where the screw nut is tightened using the screw nut driver assembly.

Then, the procedure advances to a step S5 where it is determined whether all screw nuts have been tightened. If it is determined at step S5 that not all screw nuts have been tightened ("NO" at step S5), the procedure returns to the step S3 where the pitch drive is operated again such that the screw nut driver is positioned in an alignment with another screw to be tightened.

If it is determined at step S5 that all screw nuts have been tightened ("YES" at step S5), the procedure is ended at step S6.

The invention has been described on the basis of embodiments which are shown in the appended drawings and from which further advantages and modifications emerge. However, the invention is not restricted to the embodiments described in concrete terms, but rather can be modified and varied in a suitable manner. It lies within the scope of the invention to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the invention disclosed and its broader aspects. That is, all examples set forth herein above are intended to be exemplary and non-limiting.

The invention claimed is:

1. A screw nut driver assembly adapted for automatically fastening at least one screw nut of a rotor blade bearing of a wind turbine, said screw nut driver assembly being further adapted to be mounted at a rotatable portion of the rotor blade bearing and to be aligned with a screw nut to be tightened by rotating said rotatable portion with a pitch drive of said wind turbine.

2. The screw nut driver assembly in accordance with claim 1, wherein a proximity sensor is provided which is adapted to adjust the rotational position of the screw nut driver assembly.

3. The screw nut driver assembly in accordance with claim 2, wherein the proximity sensor is an inductive detector.

4. The screw nut driver assembly in accordance with claim 2, wherein the proximity sensor is an optical detector.

5. The screw nut driver assembly in accordance with claim 1, wherein a control and position logic means is provided in the screw nut driver assembly.

* * * * *